Figure 2:
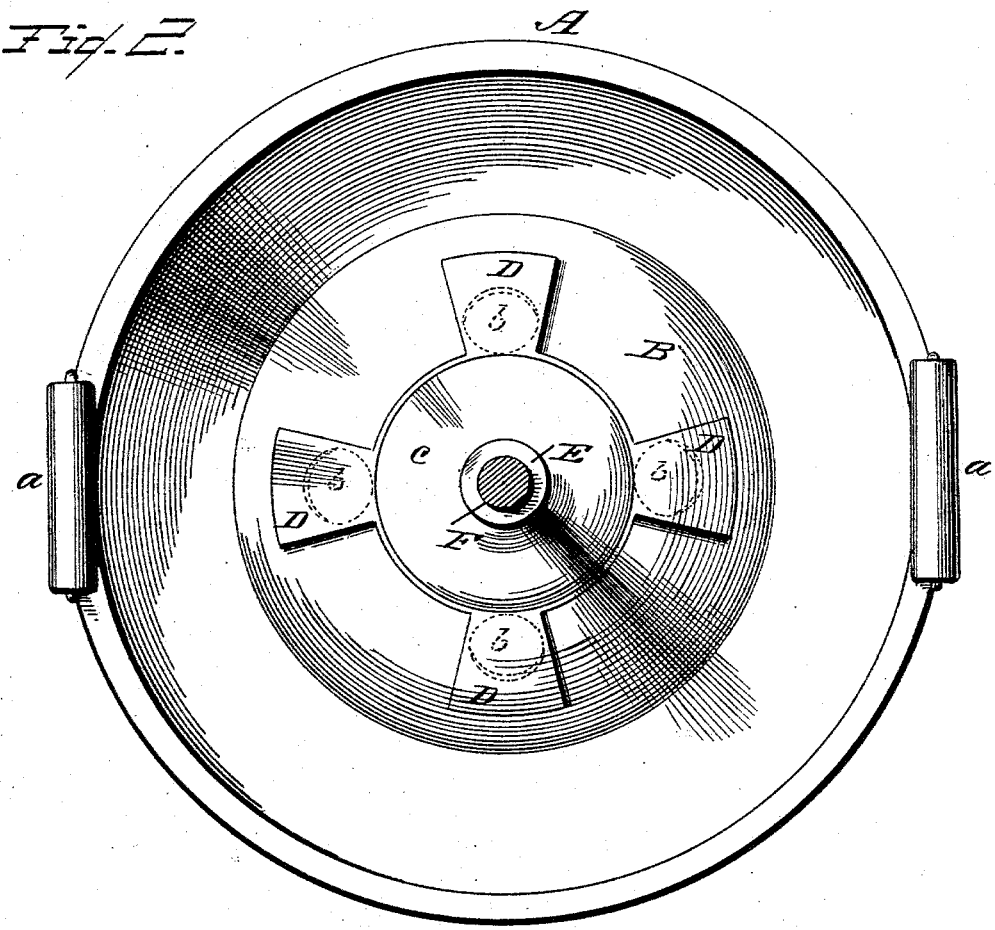

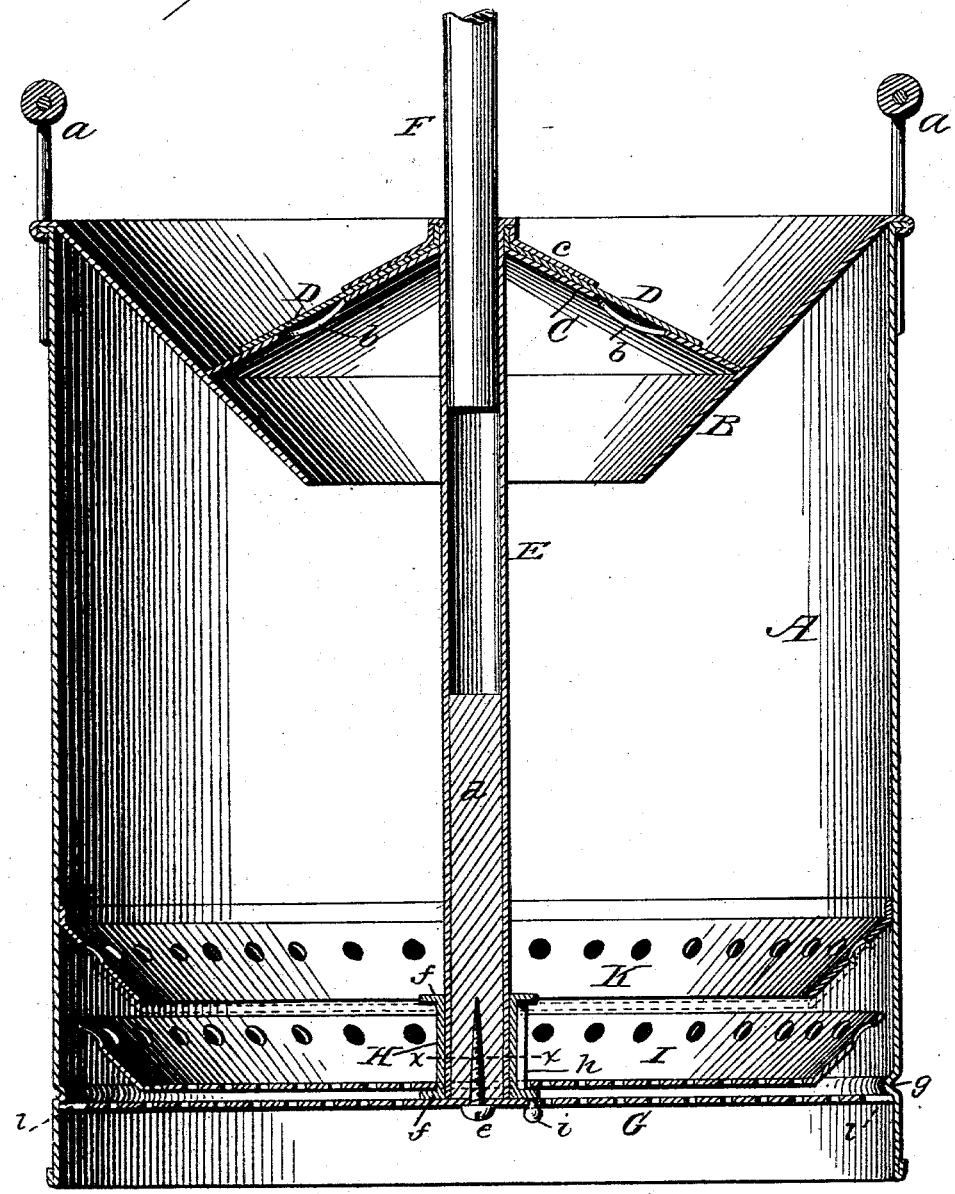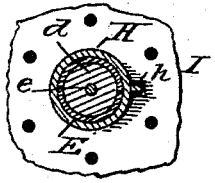

(No Model.) 2 Sheets—Sheet 2.

W. R. ALLEN.
CLOTHES POUNDER.

No. 593,073. Patented Nov. 2, 1897.

Witnesses
C. J. Williamson.
Geo. Bradbury.

Inventor
William Robert Allen,
per Chas. H. Fowler.
Attorney

UNITED STATES PATENT OFFICE.

WILLIAM ROBERT ALLEN, OF DENTON, TEXAS.

CLOTHES-POUNDER.

SPECIFICATION forming part of Letters Patent No. 593,073, dated November 2, 1897.

Application filed July 7, 1897. Serial No. 643,686. (No model.)

*To all whom it may concern:*

Be it known that I, WILLIAM ROBERT ALLEN, a citizen of the United States, residing at Denton, in the county of Denton and State of Texas, have invented certain new and useful Improvements in Clothes-Pounders; and I do hereby declare that the following is a full, clear, and exact description of the same, reference being had to the annexed drawings, making a part of this specification, and to the letters of reference marked thereon.

The present invention has for its object to provide a simple and effective clothes-pounder in which the air as well as the water is used as an agent in removing the dirt from the clothes; and it consists in the details of construction substantially as shown in the drawings and hereinafter described and claimed.

Figure 3:
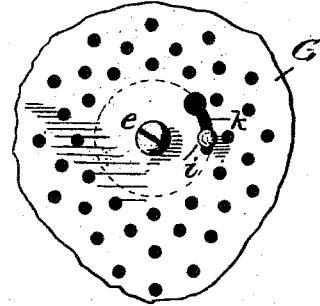

Figure 1 of the drawings is a sectional elevation of a clothes-pounder constructed in accordance with my invention; Fig. 2, a top view thereof; Fig. 3, a detail plan view of a portion of the perforated bottom of the pounder; Fig. 4, a horizontal section in detail, taken on line $x\ x$ of Fig. 1.

In the accompanying drawings, A represents the cylinder of the clothes-pounder, said cylinder being of any suitable diameter and height found most desirable and is provided with suitable handles $a$ at its sides. The cylinder A has a funnel-shaped top B, with a conical hood C suitably connected thereto and formed with openings $b$, over which are seated valves D, of rubber, leather, or other flexible material. A cone-shaped or any other suitable formed top may be used in place of that shown, this being left entirely to the discretion of the manufacturer and subject to change or alteration without departing from the principle of the invention. These valves are preferably cut from a circular piece of material, as shown in Fig. 2 of the drawings, the central portion of the piece of material being securely held down upon the conical hood B by the clamping-plate $c$, which is secured in place in any well-known manner found most desirable. A central tube E projects down into the cylinder A, and within this tube at its upper end is fitted the central handle F, the handles $a$ or the central handle F being used as found most convenient. The tube E is of sufficient length to extend down to the perforated bottom G and is connected thereto by a screw $e$, entering a wooden plug $d$, or by any other suitable means found best adapted to the purpose. A suitable sleeve H extends around the lower end of the tube E and is provided with outwardly-extending flanges $f$ at both top and bottom. Connecting with the sleeve H is a dish-shaped valve, I having perforated bottom and sides, the perforations in the sides corresponding to the size and number of the perforations in the sides of a flaring valve-plate K, which plate is secured to the interior of the cylinder some distance above the dish-shaped valve I and remains stationary, while the valve is both vertically and horizontally movable. The perforated bottom G at its outer edge bears up against the circumferential bead or flange $g$ upon the interior of the cylinder. The lower one of the flanges $f$ of the sleeve H is provided with a small knob $i$, the shank thereof projecting down through a curved guide-slot $k$ in the perforated bottom G.

The perforated dish-shaped valve I is prevented from turning independently of the sleeve H by means of a feather $h$, engaging with a notch formed in the bottom of the valve, or any other suitable and well-known means may be provided which will admit of an independent vertical movement of the valve and a horizontal movement only when the sleeve is turned upon its axis by means of the knob $i$.

When the cylinder A is pressed down in the water or suds contained in the tub or other receptacle, which also contains the clothes to be washed, the perforated dish-shaped valve I will be forced up against the flaring valve-plate K by the pressure of the water; but when the washer ascends or is lifted up the valve will fall by reason of gravitation and the pressure of the water above it, thus checking the inward flow of water when the cylinder is descending, but allowing it to empty freely when lifted up.

When the valves D are entirely over the openings $b$ and the cylinder A is raised, the pressure of the atmosphere above the valves will keep them closed, but when the cylinder descends the pressure of the air under the valves will cause them to open and allow the air to escape, thereby making the pounder air-tight and increasing the suction to a very high degree, as without this suction the clothes at the bottom would wash very slowly, as they are continually pressed against the bottom of the tub; but with the suction regulated according to the clothes being washed and amount of water the clothes are kept up from the bottom of the tub and washed as fast at the bottom as at the top or near the surface of the water. This suction is regulated by the adjustment of the valves D, which adjustment is attained by means of the movable clamping-plate c. When the plate c is turned, it will carry with it the valves D, bringing the valves to the sides of the openings and leaving them partially exposed, thus regulating the air pressure or suction to any desired degree.

By turning the sleeve H through the medium of the knob i, the valve I will be turned with it, thereby enabling the perforations in the sides of the valve to be brought into position to close or partially close the perforations in the sides of the valve-plate K when said valve is brought up against the valve-plate, as indicated in dotted lines of Fig. 1.

The opening or closing of the perforations in the valve-plate does not in any manner interfere with the outflow of the water when the cylinder is lifted up; but the inflow of water will be regulated by closing a part of the perforations, the same volume of water that would otherwise have passed through all the perforations being forced through only that portion of the perforations left open, thereby greatly facilitating the washing of extremely dirty clothes.

Openings l may be made through the bottom of the cylinder for the purpose of draining the cylinder of water and suds to prevent rusting, or any other means may be employed to accomplish this purpose.

When the knob i is brought around on a line opposite the enlarged end of the slot k and the screw e removed, the perforated bottom G, the valve I, and the sleeve H may be removed.

Having now fully described my invention, what I claim as new, and desire to secure by Letters Patent, is—

1. A clothes-pounder consisting of a suitable cylinder provided with a perforated bottom, a circular perforated valve-plate secured to the interior of the cylinder, and a vertically and horizontally movable perforated valve adapted to close up against the valve-plate, substantially as and for the purpose set forth.

2. A clothes-pounder consisting of a suitable cylinder, a stationary perforated valve-plate, a vertically and horizontally movable perforated valve operating in connection therewith, a closed top to the cylinder having openings, and adjustable flexible valves over the openings, substantially as and for the purpose described.

3. A clothes-pounder provided with a detachable perforated bottom, a central tube to which said bottom is connected, a flanged sleeve adapted to turn on its axis, a vertically and horizontally movable perforated valve connecting with the sleeve, a perforated valve-plate secured around the interior of the cylinder, a closed top to said cylinder having openings and adjustable valves, substantially as and for the purpose specified.

In testimony that I claim the above I have hereunto subscribed my name in the presence of two witnesses.

WILLIAM ROBERT ALLEN.

Witnesses:
R. L. Boss,
M. G. Jarreau.